United States Patent [19]

Wade

[11] Patent Number: 4,791,806

[45] Date of Patent: Dec. 20, 1988

[54] LEAK DETECTION SYSTEM

[76] Inventor: James H. Wade, P.O. Box 2556, Castro Valley, Calif. 94546

[21] Appl. No.: 112,993

[22] Filed: Oct. 23, 1987

[51] Int. Cl.[4] .............................................. G01M 3/20
[52] U.S. Cl. .................................................... 73/40.7
[58] Field of Search .................................. 73/40.7, 40

[56] References Cited

U.S. PATENT DOCUMENTS

| | | | |
|---|---|---|---|
| 3,034,338 | 5/1962 | Snyder | 73/40.7 |
| 3,126,734 | 3/1964 | Stutzman | 73/40.7 |
| 3,751,989 | 8/1973 | Briggs et al. | 73/40.7 |
| 3,902,068 | 8/1975 | Wood | 73/40 |
| 4,499,752 | 2/1985 | Fuzzetti et al. | 73/40.7 |
| 4,515,007 | 5/1985 | Herman | 73/40.7 |

*Primary Examiner*—Stewart J. Levy
*Assistant Examiner*—Hezron E. Williams
*Attorney, Agent, or Firm*—Thomas R. Lampe; Glen R. Grunewald

[57] ABSTRACT

A system for detecting leaks in pasteurization plates and the like wherein the plate forms a chamber with a support surface and a gasket, a vacuum is formed in the chamber, and leaks in the plate detected by passing a gas through the plate and sensing the presence of said gas in the chamber.

15 Claims, 3 Drawing Sheets

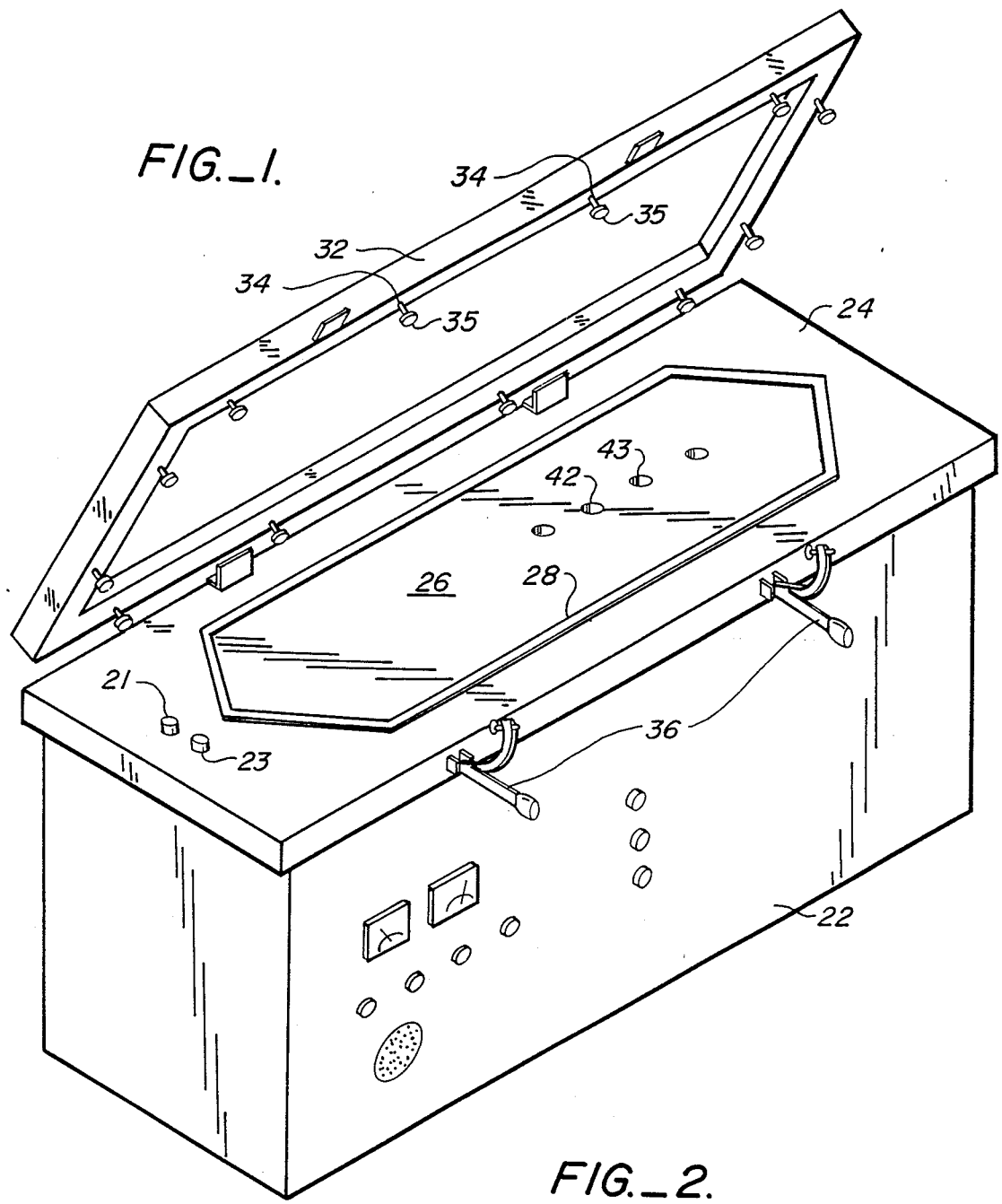
FIG._1.
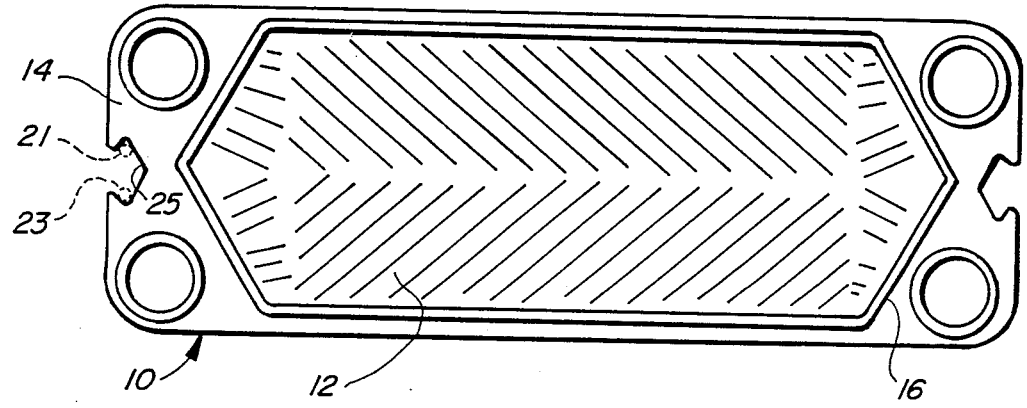
FIG._2.

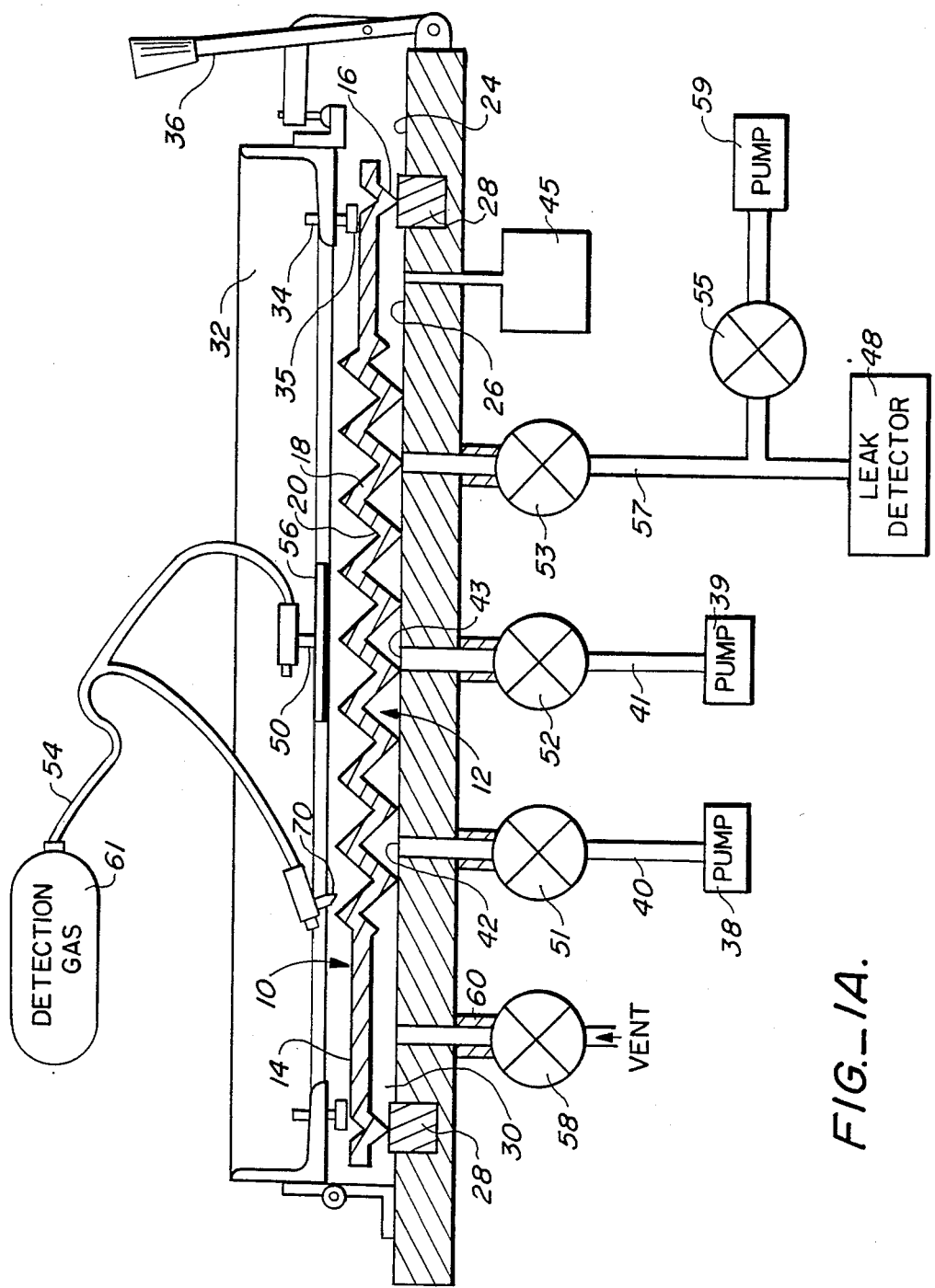
FIG._1A.

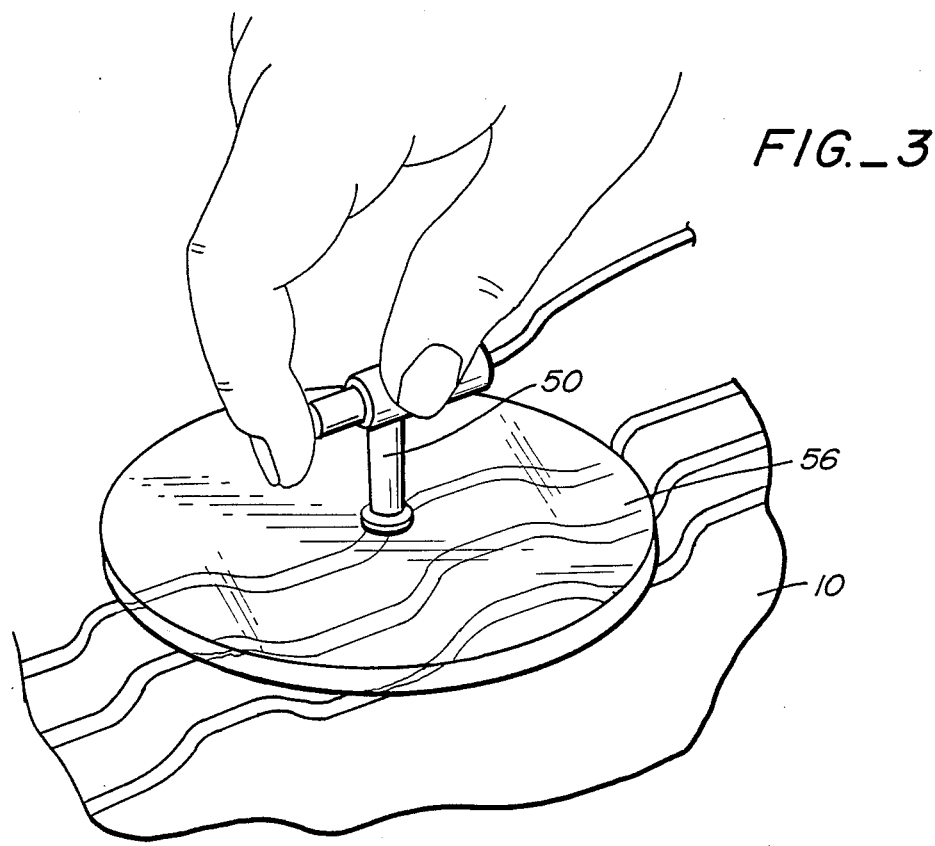
FIG._3
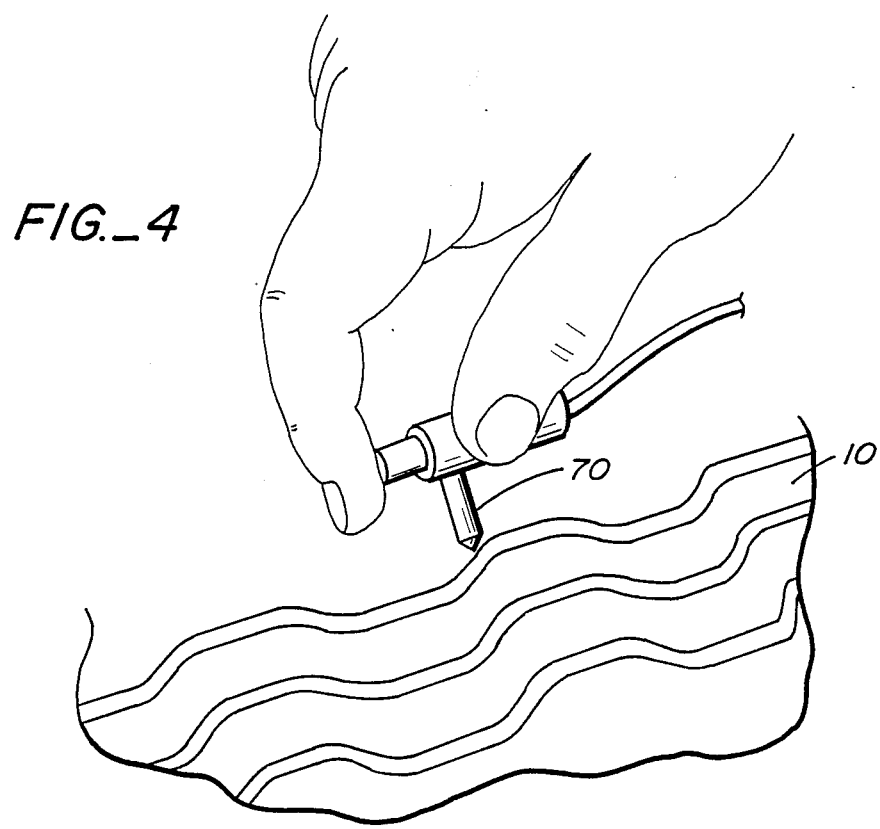
FIG._4

LEAK DETECTION SYSTEM

TECHNICAL FIELD

The present invention relates, in general, to a method and apparatus for detecting leaks in a plate having an inner body portion defining a plurality of ribs and channels, an outer body portion disposed about the inner body portion, and a separating rib positioned between the body portions and extending continuously circumferentially about the inner body portion. An example of a plate of this type is a plate employed in the pasteurization process wherein milk flows between a plurality of stacked plates in a press, heated during the course of such flow, and subsequently cooled.

Pasteurization plates must be tested periodically to ensure the absence of holes therein. Even microscopic-sized holes in a pasteurization plate can cause dangerous milk contamination. For example, pasteurization plate leaks have resulted in salmonella and other pathogenic bacteria bypassing the pasteurization process and causing consumer illness and even death. Plates in a pasteurization press constantly wear against adjacent plates during use and apertures caused by this contact are a significant problem in the industry.

The testing of pasteurization plates is conventionally carried out by applying a testing agent such as a red dye to one surface thereof, the operating theory being that the dye will eventually pass through any holes in the plate and appear on the other side thereof to which a white coating has been applied. This prior art approach to testing for leaks in pasteurization plates and the like has a number of disadvantages. First of all, the dye must remain on a surface of the plate a very long time, a matter of hours in fact, before one can be reasonably assured that no holes exist. Further, a plate must be dry before the dye and white coating are applied and cleaned of the dye and coating thereafter. If all of the dye and coating are not removed from the plate, these agents themselves can be a source of contamination. Because pasteurization plates have uneven surfaces, dye removal is often difficult, if not impossible. Obviously, all of these procedures cumulatively take up a great deal of time, time during which the plate and the press it comes from are out of service.

But dye has an even greater drawback in that inconclusive testing can result. Quite simply, dye cannot be relied upon as a 100 percent indicator of pasteurization plate leaks. Milk leaking through a plate in even the most minute quantities can result in the pasteurization process not being completely effective. Dye has a tendency to plug extremely small but potentially very harmful holes in a plate. This is highly dangerous because such small holes may then reopen during use of the plate in its press. The press operator will labor under the false impression that the plate is sound when in fact it is not. Then too, many dyes have a molecular size which prevent passage through very small holes which readily accommodate bacteria.

As will be described in greater detail below, the system of this invention utilizes helium to detect leaks in pasteurization plates. The use of helium per se as a tracer gas in leak detection systems is not generally new. In fact, helium has been used as a tracer gas since at least the time of the Manhattan Project in World War II, being selected as a tracer primarily because, as the lightest inert gas, it penetrates small leaks readily and is non-contaminating.

DISCLOSURE OF THE INVENTION

The apparatus and method of the present invention relate, respectively, to a combination of structural elements and method steps which cooperate in a unique manner to employ the advantages of helium as a tracer gas when testing pasteurization plates and similar types of plates.

According to the teachings of the invention, a plate having an inner body portion defining a plurality of ribs and channels, an outer body portion disposed about the inner body portion, and a separating rib positioned between the body portions and extending continuously circumferentially about the inner body portion is placed upon a support.

The support defines a support surface and includes a gasket extending upwardly from the support surface. The gasket is adapted to engage the separating rib of the plate along the entire length of the separating rib with at least some of the plate inner body portion being spaced from the support surface.

Means is provided for urging the separating rib and gasket together to form a seal therebetween whereby a substantially gas-tight chamber is formed between the inner body portion and the support surface. Vacuum pump means pumps air from the chamber to form a vacuum therein.

Means is provided for directing a gas against the plate on the side thereof disposed away from the support surface, and gas sensing means is operatively associated with the vacuum pump means for sensing the presence of the gas in air pumped from the substantially gas-tight chamber.

First, the gas is directed against the plate over a broad area. This continues until the entire area of the plate corresponding to the inner body portion is contacted by gas. If the presence of the gas is sensed during this initial stage, the gas is again directed against the plate, this time in a narrow presence of gas in the chamber was initially sensed.

The operation just described can be carried out within a very short period of time, a matter of minutes, without having to prepare the plate or clean it later.

BRIEF DESCRIPTION OF THE DRAWINGS

FIG. 1 is a perspective view of a preferred form of the apparatus constructed in accordance with the teaching of the present invention;

FIG. 1A is a schematic presentation of components of the apparatus;

FIG. 2 is a plan view of a representative pasteurization plate;

FIG. 3 illustrates a nozzle and associated deflector utilized during a step of the method of this invention; and FIG. 4 illustrates another type of nozzle utilized subsequent to the use of the arrangement in FIG. 3.

BEST MODE FOR CARRYING OUT THE INVENTION

Referring now to the drawings, a pasteurization plate 10 is shown in FIG. 2, said plate having an inner body portion 12, an outer body portion 14 disposed about the inner body portion, and a separating rib 16 extending continuously circumferentially about the inner body portion.

The inner body portion 12, as perhaps may best be seen in FIG. 1A, defines a plurality of ribs 18 and channels 20. It will be appreciated that pasteurization plate 10 is of the conventional type employed in a pasteurization press (not shown) wherein a plurality of such plates are stacked one upon the other, with the ribs 18 of adjacent plates pressed into engagement whereby the milk or other liquid to be pasteurized flows between the ribs 18 and through the channels.

It will be appreciated further that the particular rib and channel configuration illustrated in the drawings is representative only and that the system of the present invention may be just as effectively utilized with other types of rib channel configurations within the plate inner body portion. Common to such plates, however, is the separating rib 16 extending continuously circumferentially about the inner body portion which assists in the formation of a fluid-tight seal with an adjacent plate in the press. Pasteurization plates such as plate 10 are typically produced of stainless steel or titanium.

The apparatus for detecting leaks in plate 10 includes a framework or housing 22. Located at the top of the framework is a support 24 for the plate 10, said support defining a support surface 26 and including a gasket 28 extending outwardly from the support surface a distance of about ¼ inches. The gasket 28 is constructed of any suitable material, such as synthetic rubber, and is adapted to engage the separating rib 16 of the plate along the entire length of the separating rib. Locator pins 21, 23 preferably extend upwardly from support surface 26 and are positioned in an indent 25 of the plate 10 to facilitate placement of the plate.

Means is provided for urging the separating rib and gasket together to form a seal therebetween whereby a substantially gas-tight chamber 30 (FIG. 1A) is formed between the inner body portion 12 and support surface 26. The illustrated means for accomplishing this is a generally rectangular-shaped member 32 which is open in the interior portion thereof, pivotally mounted on framework 22, and selectively movable by the operator from a first position in which the plate is engaged by the member to a second position in which the member is spaced from the plate. Projections 34 extend from member 32, being adjustable threadedly secured thereto, and engage the plate when the member is in said first position. The projections preferably have caps 35 thereon, the caps being formed of rubber or other resilient material to prevent plate damage and accommodate plate warpage or width variations. Projections 34 are engagable with the plate at spaced locations thereon on the side of the plate disposed away from the support surface 26 at a plurality of locations on the plate in general registry with the gasket 28. Thus, separating rib 16 is positively and securely pressed into engagement with the gasket. Preferably, clamping means 36 of any suitable type is provided to clamp member 32 and framework 22 together to ensure this positive engagement between the gasket and the separating rib.

After plate 10 has been positioned and clamped into engagement with support 24, air is pumped from chamber 30 to form a vacuum therein. The air is initially pumped by vacuum pumps 38 and 39 mounted in the interior of framework 22. Conduits 40 and 41 provide communication between the inlets of vacuum pumps 38 and 39, respectively, and apertures 42, 43 formed in support surface 26. Air pumped from chamber 30 by vacuum pumps 38, 39 is directed to the ambient atmosphere. After the air pressure in chamber 30 falls to a predetermined level, as determined, for example, by pressure sensing device 45, valves 51 and 52 in lines 40, 41 are closed. This may be done manually but is preferably accomplished automatically by any suitable known control system. Valves 53 and 55 in line 57 are then opened. This provides communication with pump 50 which brings the chamber pressure to the desired level. Line 57 is in communication with a helium detector device 48 which may be of any known type. Suitable such detectors are helium mass spectrometers sold by Varian Associates and identified as Model Nos. 925-40, 936-40, 938-40.

Preferably, the air pressure within chamber 30 is about 350 microns of pressure or lower when testing for the presence of helium within the chamber takes place. This level is reached very quickly, not only because of the efficiency of the pumping means, but also because the chamber, over substantially the full extent thereof, is shallow enough to cause engagement by the ribs of plate 10 with surface 26. By pulling a 350 micron vacuum on the bottom side of the plate, one is, in effect, applying 14 psi to the outside of the plate, which causes such engagement.

The next step of the method of this invention comprises directing helium gas against the plate 10 on the side of the plate disposed away from support surface 26. In the disclosed preferred embodiment of the invention, helium gas is directed against the plate by means of a hand-held nozzle 50 (FIGS. 1A and 3) in selective communication with a source 61 of helium gas through a hose 54. A suitable, conventional, manually operated valving arrangement can be used to establish or shut off communication between the nozzle and the source of helium as at the will of the operator. Disposed closely adjacent to the nozzle and radiating outwardly therefrom is a deflector 56 in the form of a flat disc.

To direct helium against the plate 10 the operator orients the nozzle so that the outlet thereof is directed toward the plate with deflector 56 being maintained generally parallel thereto. The nozzle outlet is held fairly close to the plate, in the order of ¼-1 inch, for example, so that the helium impacts against the plate and is subsequently deflected outwardly and downwardly by deflector 56 because of the relatively confined space existing between the deflector and the plate. Thus, the helium will contact the plate surface over a relatively broad area thereof and be maintained in contact with the rib 18 and channel 20 segments in general registry with deflector 56.

The operator moves the nozzle and deflector back and forth across plate 10 until gas has been directed over the entire inner body portion. If no helium is sensed within chamber 30 during this procedure the plate is considered to be sound and without leaks, at least insofar as the inner body portion thereof is concerned, the only portion wherein a leak could cause press contamination. The vacuum pump is then shut off and the chamber 30 is placed into communication with the ambient atmosphere by opening a valve 58 on a vent line 60. Clamping means 36 are then unclamped and member 32 brought to its second position so that the plate may be removed. Another plate may then be tested in the same expeditious manner.

If, however, helium detector device 48 detects the presence of helium within chamber 30 during the passage of nozzle 50 and deflector 56 over the plate, a further gas directing step must be carried out. In this second step, a nozzle 70 having a very small, virtually pin point, outlet orifice and no deflector connected thereto is used to direct helium toward the plate in a narrow stream in the area of the plate in general registry with the deflector at the time the presence of gas in the chamber was first sensed. In other words, the first step insofar as the application of helium is concerned was carried out to cover the entire inner body portion of the plate in broad area increments. Once a problem was detected in a broad area the precise location of the leak within the area is tied down. The plate will then either be repaired or discarded.

Because very little space is defined between plate 10 and support surface 26 during the test procedure, the presence of helium in the chamber 30 is detected virtually simultaneously with the passage of helium through a hole in the plate. Thus, the exact location of the leak source can be located promptly and precisely.

What is claimed is:

1. Apparatus for detecting leaks in a plate, such as a pasteurization plate, having an inner body portion defining a plurality of ribs and channels, an outer body portion disposed about said inner body portion, and a separating rib positioned between said body portions and extending continuously circumferentially about said inner body portion, said device comprising:
   a support for said plate, said support defining a support surface and a gasket extending outwardly from said support surface, said gasket adapted to engage the separating rib of said plate along the entire length of said separating rib with at least some of the plate inner body portion being spaced from said support surface:
   a member engageable with said plate on the side of said plate disposed away from said support surface for urging said separating rib and gasket together to form a seal therebetween whereby a substantially gas-tight chamber is formed between said inner body portion and said support surface, said member defining an open interior portion in at least partial registry with the plate inner portion whereby said plate inner portion is in communication with ambient atmosphere on the side of the plate disposed away from said support surface and whereby said plate may be manually accessed through said member open interior portion;
   vacuum pump means for pumping air from said chamber to form a vacuum within said chamber;
   means positionable within said member open interior portion and selectively moveable relative to said plate within said member open interior portion for directing a gas against the plate on the side of said plate disposed away from said support surface; and
   gas sensing means for sensing the presence of said gas in air pumped from said substantially gas-tight chamber.

2. The apparatus of claim 1 wherein said gas directing means includes a nozzle and a deflector radiating outwardly from said nozzle, said nozzle and deflector adapted to be placed within said member open interior portion with said deflector in close proximity with said plate to define a relatively confined space between said deflector and said plate whereby said gas will contact the surface over a relatively broad area thereof.

3. The apparatus of claim 1 additionally comprising valve means in operative association with said vacuum pump means and said gas sensing means, said valve means adapted, after pressure within said chamber falls below a predetermined level, to establish communication between said chamber and said gas sensing means.

4. The apparatus of claim 1 wherein said member for urging said separating rib and said gasket together includes spaced projections engageable with said plate at a plurality of locations on said plate in general registry with said gasket.

5. The apparatus as claim 4 including a framework, said member being mounted on said framework and selectively moveable from a first position in which the plate is engaged thereby to a second position in which the member is spaced from said plate.

6. The apparatus according to claim 2 wherein said gas detecting means includes a second nozzle, said nozzle being positionable within said member open interior portion and adapted to direct gas against said plate in a narrow stream.

7. The apparatus of claim 1 wherein said support surface is substantially flat within the area defined by said gasket whereby said chamber, over substantially the full extent thereof, is shallow.

8. The apparatus according to claim 1 wherein said plate support, said member for urging said separating rib and gasket together, said vacuum pump means, and said gas sensing means are commonly mounted on a transportable framework.

9. A method for detecting leaks in a plate having an inner body portion defining a plurality of ribs and channels, an outer body portion disposed about said inner body portion, and a separating rib positioned between said body portions and extending continuously circumferentially about said inner body portion, said method comprising the steps of:
   positioning a plate over a support surface having a gasket extending outwardly therefrom;
   engaging the separating rib and the gasket along the entire length of said separating rib with at least some of the plate inner body portion being spaced from said support surface;
   urging said engaged separating rib and gasket together to form a seal therebetween whereby a substantially gas-tight chamber is formed between said inner body portion and said support surface;
   pumping air from said chamber to form a vacuum in said chamber;
   after forming said vacuum, directing a gas a first time against said plate over a substantial portion of said plate on the side thereof disposed away from said support surface;
   sensing the presence of said gas in said chamber while directing said gas the first time; and
   directing gas toward said plate a second time after the presence of gas in said chamber is sensed while directing said gas the first time, said gas during said step of directing gas the second time being directed toward said plate in a narrow stream in the general area of the plate where gas was directed the first time when the presence of gas in the chamber was sensed.

10. The method according to claim 9 wherein the gas is directed against said plate the first time through a nozzle, and including the additional step of spreading said gas laterally from said nozzle along said plate other side to cover a substantial portion of said plate.

11. The method according to claim 10 wherein the step of spreading the gas laterally is carried out by placing a deflector into close proximity with said plate to define a relatively confined spaced between said deflector and said plate.

12. The method according to claim 11 wherein said nozzle and deflector are moved relative to said plate until gas has been directed over the entire inner body portion on the other side of the plate.

13. The method of claim 9 wherein said air is pumped from said chamber in two substeps, the first substep comprising pumping said air directly to the ambient atmosphere, the second substep comprising pumping said air to gas detecting means after the air pressure in said chamber falls to a predetermined level.

14. The method of claim 13 wherein said predetermined level is about 350 microns of pressure or lower.

15. The method of claim 9 wherein said step of urging said separating rib and gasket together is carried out by exerting pressure on said plate on the side of said plate disposed away from said support surface at a plurality of locations on said plate in registry with said gasket.

* * * * *